A. THOMSON.
VALVE.
APPLICATION FILED MAY 1, 1915.

1,158,869.

Patented Nov. 2, 1915.

Witness.
Inventor
Alexander Thomson.
by his Attorney

UNITED STATES PATENT OFFICE.

ALEXANDER THOMSON, OF SUMMIT, NEW JERSEY.

VALVE.

1,158,869.

Specification of Letters Patent.

Patented Nov. 2, 1915.

Application filed May 1, 1915. Serial No. 25,093.

*To all whom it may concern:*

Be it known that I, ALEXANDER THOMSON, a citizen of the United States, and resident of Summit, in the county of Union and State of New Jersey, have invented certain new and useful Improvements in Valves, of which the following is a specification.

This invention relates to certain improvements in valves for controlling the escape of fluid under pressure and more particularly to that type in which a main valve in the form of a diaphragm is held in closed position by the action of the fluid in a pressure chamber, the escape from which is controlled by an auxiliary valve.

My invention in its preferred embodiment is particularly adapted for use in controlling the admission of water to a flush tank or other float chamber and is so designed that the auxiliary valve may be directly connected to the float and be operated thereby. It is of course evident that in using the valve in other connections the auxiliary valve might be operated manually or in any other suitable manner.

One of the main objects of my invention is to simplify the construction and thereby reduce the cost of manufacture and to so design the parts that they may be readily and quickly installed. The pressure chamber with the auxiliary valve may be readily removed to permit the repair or replacement of the diaphragm, without disturbing the pipe connections to the main inlet and outlet chambers of the valve while access may be gained to the auxiliary valve for purposes of repair or replacement without removing the main valve, float, the valve stem or any other parts except the cap. The pressure of the liquid in the pressure chamber not only holds the diaphragm to its seat, but also tends to press the auxiliary valve against its seat and leakage is effectively prevented.

Reference is to be had to the accompanying drawing in which I have shown one embodiment of my invention.

Figure 1:
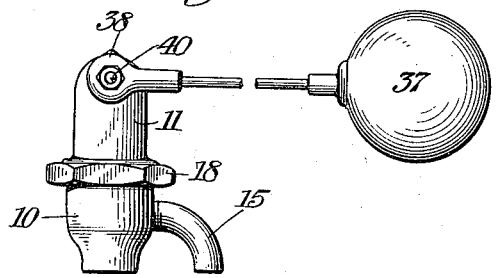
Figure 2:
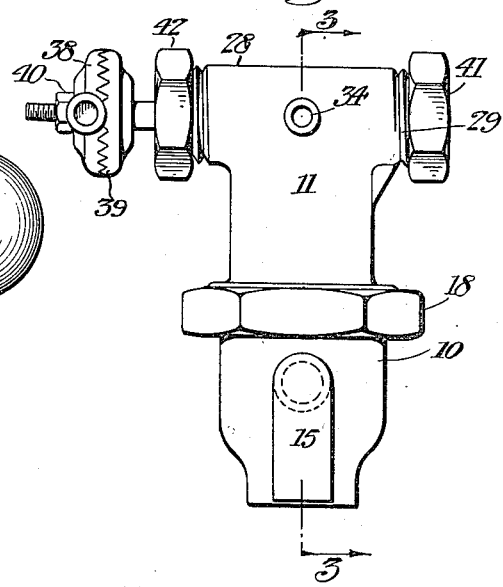
Figure 3:
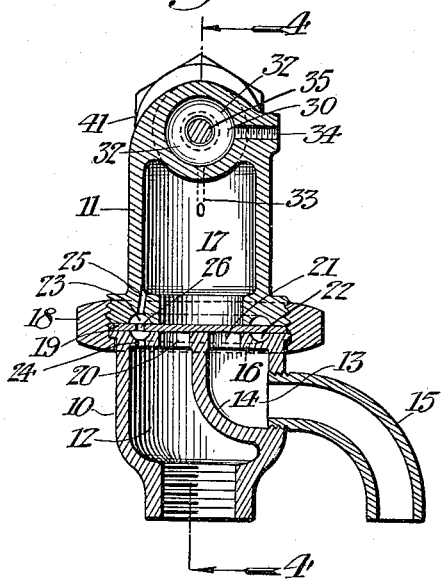
Figure 4:
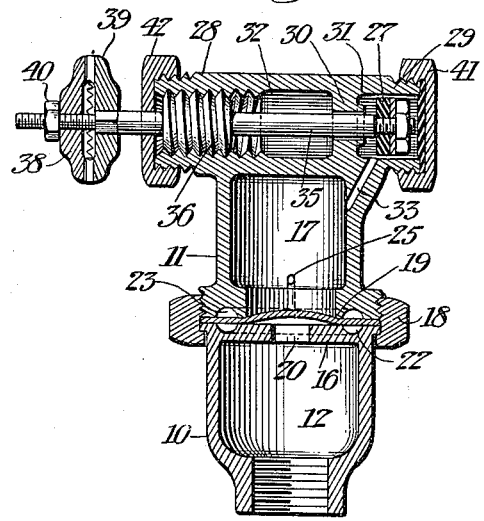

In these drawings: Figure 1 is a side view of the device illustrated in connection with an operating float; Fig. 2 is a face view on a somewhat larger scale; Fig. 3 is a section on the line 3—3 of Fig. 2, and Fig. 4 is a section on the line 4—4 of Fig. 3.

In the specific embodiment of my invention, which I have illustrated, the valve casing is formed of two cast metal sections 10 and 11. The section 10 has an inlet chamber 12 and an outlet chamber 13 separated by a partition 14. To these two chambers are connected the supply and delivery conduits. The section may be supported directly upon the supply conduit and the delivery conduit may, in some cases, be omitted or may consist merely in an elbow or spout 15. The partition 14 is cast integral with the section, as is also a transversely extending wall 16, flush with the upper edges of the periphery wall of the next section and constituting a top wall for the two chambers 12 and 13.

The section 11 has a main pressure chamber 17 having permanently open but restricted communication with the inlet chamber 12. As shown, the section 11 is externally threaded at its lower end while the section 10 is provided with an outwardly extending flange or shoulder, the upper surface of which is flush with the top wall 16. A collar 18 has a flange or shoulder for engaging with the under side of the flange or shoulder on the section 10 and is internally threaded to receive the threaded portion of the section 11. By means of this collar, the two sections are held together.

Between the two sections is placed an elastic, rubber diaphragm 19 tightly clamped about its periphery. The central portion of the diaphragm is free to expand or stretch upwardly, and directly beneath this central portion, the top wall 16 has a port 20 communicating with the inlet chamber 12 and a port 21 communicating with the outlet chamber 13. When the diaphragm is in normal position, as shown in Fig. 3, it lies flat upon the top wall 16 and thus closes both of the ports 20 and 21, but when the central portion is bowed or stretched upwardly as shown in Fig. 4, the water may flow from the inlet chamber 12 up through the port 20 and down through the port 21 to the outlet chamber.

The permanently open but restricted communication between the pressure chamber 17 and the inlet chamber 10 is preferably such that it is unaffected by orientation of the two sections. As shown, the top wall 16 has an annular groove 22 in its upper face 11, and the upper section has a groove 23 in the face of its lower end. The grooves oppose each other and are in permanent communication with the chambers 12 and 17 through small passages 24 and 25. The diaphragm may be made small enough so that it does not cover the grooves or the diaphragm may be provided with an aperture 26 registering with the two grooves. It is thus immaterial whether the passages 24 and 25 of the two sections and the passage through the diaphragm are in alinement. The liquid from the inlet chamber 12 may at all times flow through the passages and grooves to the pressure chamber 17, until the fluid pressure in the latter is equal to the pressure of the liquid in the inlet 12.

So long as the pressures in the chambers 12 and 17 are equal, the diaphragm constituting the main valve will be held down and the flow of liquid from the inlet chamber 12 to the outlet chamber 13 will be prevented.

In order to control the escape of liquid from the pressure chamber 17 and to thereby control the pressure in said chamber, I provide an auxiliary valve 27 which may be operated by a float, a manually operated lever, or in any other suitable manner. In the preferred construction, the section 11 is cast with two oppositely extending cylindrical bosses 28 and 29 in alinement with each other and between the two is cast a partition 30 separating the interior of the upper portion of the casing into two chambers 31 and 32. The chamber 31 is in permanent communication with the pressure chamber 17 through a passage 33 formed in the wall of the section. The chamber has an outlet port 34 through which the liquid may discharge to low pressure. The valve 27 is disposed within the chamber 31, which is the high pressure chamber, and is movable toward and from a valve seat formed on the partition 30. The auxiliary valve 27 is carried by a valve stem 35 which projects through the partition 30 and is provided with a body portion 36 of considerable larger diameter than the valve stem and serving as a plug for the end of the chamber 32. The body portion of the plug 36 is externally threaded with coarse threads of such pitch that a rotation of the stem 35 through a portion only of a revolution will move the auxiliary valve through the required distance.

For rotating the valve stem, I preferably provide a float 37 which may be rigidly connected to a toothed collar 38 on the end of the valve stem. A second collar 39 is carried by the valve stem and held against rotation in respect to the latter. The opposed faces of these two collars are provided with teeth so that when the two collars are held in engagement with each other by the tightening of a nut 40 on the end of the valve stem, the valve stem will rotate upon a raising or lowering of the float. The proper adjustment to measure the closing of the auxiliary valve when the water has reached the desired level is secured by clamping the two collars 38 and 39 in the desired relative positions. The ends of the two posts 28 and 29 are preferably externally threaded and are closed by caps 41 and 42. The cap 41 forms the end of the valve chamber for the auxiliary valve and therefore is preferably provided with a gasket to prevent the escape of liquid from the chamber except on the opening of the valve. The cap 42 may, if desired, be omitted although it may serve as a stop to limit the endwise movement of the valve stem and thus prevent the valve from being injured or cut by being forced against its seat with greater pressure than is necessary to secure an effective closing of the valve.

With the parts in normal position, the chambers 31 and 17 are filled with liquid under the same pressure as is the liquid in the inlet chamber 12. The liquid in the pressure chamber 17 holds the diaphragm against the ports 20 and 21 and thus the main valve is closed. When the float is lowered and the auxiliary valve is away from its seat, the liquid in the chamber 17 may escape through the passage 11, the valve chamber 31, the passage along the valve stem 35, and the chamber 32, to the outlet 34. The liquid can escape faster than it can enter the chamber 17 through the passages 24 and 25 and thus there will be a reduction in pressure in the chamber 17 and the diaphragm can rise to permit the flow of liquid through the ports 20 and 21. When the auxiliary valve is again closed, the liquid will continue to flow to the chamber 17 until the pressure is sufficient to force the diaphragm down and close the main valve.

It will be noted that the lower end of the passage 33 is somewhat below the upper end of the chamber 17 so that air will be trapped in said chamber and a body of compressed air will be maintained which will increase the rapidity of action of the diaphragm. It is of course evident that I might, in some constructions, have the passage under the uppermost part of the chamber 17 so as to prevent the trapping of any compressed air in the latter.

Although my improved valve may be operated by any suitable mechanism, it is particularly designed for use in connection with a ball float and by reason of the fact that the valve moves to its seat by a combined rotary and axial movement and in the direction of flow of the liquid, a very much smaller float may be employed than is necessary in connection with the ordinary constructions of ball cocks. A float of two inch or two and a half inch diameter may be used in place of the usual five inch or six inch float.

Various changes may be made in the details of construction within the scope of the claims, without departing from the spirit of my invention. For instance, the form and construction of the chambers 12 and 13 may be varied very materially from the specific construction shown and the delivery and supply conduits may enter either at the side or at the bottom and may be either straight or curved. The chamber 13 might serve as the inlet chamber and the chamber 12 as the outlet chamber if the passage 24 be closed, and a corresponding passage be formed between the groove 22 and the chamber 13. The diaphragm, although preferably of rubber, may be of any other suitable material, or may be replaced by some other form of main valve designed to be controlled and operated by fluid pressure.

Having thus described my invention, what I claim as new and desire to secure by Letters Patent is:

1. A valve including two main cast metal sections, one of said sections having an inlet chamber and an outlet chamber, and the other of said sections having a pressure chamber in open but restricted communication with said inlet chamber, a diaphragm normally preventing communication between said inlet and outlet chambers, and said second mentioned section having a transversely extending tubular portion terminating in two oppositely disposed bosses, a transverse partition dividing said tubular portion into a valve chamber in one of said bosses communicating with said pressure chamber and a discharge chamber between said bosses having an outlet, an auxiliary valve within said valve chamber, and normally preventing flow of liquid from said valve chamber to said discharge chamber, a valve stem having a body portion extending through said discharge chamber and threaded within the other boss and projecting out through the end of the latter, caps for the outer ends of said bosses, and means at the outer end of said valve stem for rotating the latter and said valve.

2. A valve casing having inlet and outlet chambers and a pressure chamber communicating with said inlet chamber, a main valve normally preventing communication between said inlet chamber and said outlet chamber and held to its seat by the pressure of liquid within said pressure chamber, two oppositely disposed bosses, one of said bosses having a valve chamber communicating with said pressure chamber, a cap closing the outer end of said boss, an auxiliary valve within said valve chamber and normally preventing flow of liquid from said valve chamber, a discharge chamber between said bosses and having open communication with the exterior of said valve casing, a valve stem extending through said discharge chamber and having a threaded portion closing the other of said bosses, and means at the outer end of said valve stem for rotating the latter and said valve.

3. In combination, a valve casing and a main valve disposed therein, said valve casing being formed with a pressure chamber having open communication with a source of fluid supply and permitting the holding of the valve in closed position by fluid pressure, and two separate chambers, one constituting an auxiliary valve chamber in open communication with said pressure chamber and the other constituting a discharge chamber in open communication with the exhaust, a valve within said auxiliary valve chamber and controlling the communication between said auxiliary valve chamber and said discharge chamber, a valve stem secured to said auxiliary valve and extending through said discharge chamber to the exterior of said casing and having threaded engagement with the latter, and a removable cap in axial alinement with said valve stem and closing the outer end of said auxiliary valve chamber.

Signed at Summit in the county of Union and State of New Jersey this 19th day of April A. D. 1915.

ALEXANDER THOMSON.

Witnesses:
BURROUGHS B. WALLING,
WILLIAM T. BUTLER.

Copies of this patent may be obtained for five cents each, by addressing the "Commissioner of Patents, Washington, D. C."